United States Patent [19]

Strock et al.

[11] Patent Number: 5,186,691
[45] Date of Patent: Feb. 16, 1993

[54] TRI-LOBE SHEAVE

[76] Inventors: Charles E. Strock, 5637 Montgomery Church Rd., Greencastle, Pa. 17225; Scottie J. Oliver, 3596 Lightouse Rd., Chambersburg, Pa. 17201

[21] Appl. No.: 840,043

[22] Filed: Feb. 24, 1992

[51] Int. Cl.⁵ ............................................. F16H 7/00
[52] U.S. Cl. .................................................. 474/166
[58] Field of Search ................ 474/166, 101, 134, 152

[56] References Cited
U.S. PATENT DOCUMENTS 4,804,353  2/1989  Wennian ............................. 474/152
4,987,333  1/1991  Noguchi et al. ................ 474/166 X Primary Examiner—Thuy M. Bui
Attorney, Agent, or Firm—Leon Gilden

[57] ABSTRACT

A low speed adjusting sheave effects varying ratios according to RPM and tension of an associated belt. The sheave structures include end caps resiliently biasing frusto-conical flanges into communication with one another to position a drive belt therebetween.

4 Claims, 4 Drawing Sheets

TRI-LOBE SHEAVE

BACKGROUND OF THE INVENTION

1. Field of the Invention

The field of invention relates to sheave apparatus, and more particularly pertains to a new and improved tri-lobe sheave wherein the same is arranged to effect varying ratios and orientation of drive and driven belts between cooperating flanges of the sheave structure.

2. Description of the Prior Art

The centering and alignment of cooperating flanges relative to sheave structure has in the prior art been of a costly and complex construction. The instant invention attempts to overcome deficiencies of the prior art by providing for cooperating flanges in a sheave organization to effect spreading of the cooperating flanges to accommodate a drive belt therebetween in accordance to speed of the belt structure mounted within the sheave structure.

Prior art sheave apparatus has been set forth in U.S. Pat. No. 4,149,425 to Williams wherein an adjustable door flange sheave includes spring biased flanges cooperating relative to one another to accommodate variations of speed of a sheave structure.

U.S. Pat. No. 4,023,247 to Baer; U.S. Pat. No. 4,301,995 to Niskin., and U.S. Pat. No. 4,421,498 to Deleu, et al. are further examples of adjustable sheave structure of the prior art.

Accordingly, it may be appreciated that there continues to be a need for a new and improved tri-lobe sheave as set forth by the instant invention which addresses both the problems of ease of use as well as effectiveness in construction in maintaining the sheave apparatus in a fixed orientation relative to a shaft member directed coaxially therethrough and in this respect, the present invention substantially fulfills this need.

SUMMARY OF THE INVENTION

In view of the foregoing disadvantages inherent in the known types of sheave apparatus now present in the prior art, the present invention provides a tri-lobe sheave wherein the same is directed to the proper positioning and maintenance of cooperating frusto-conical flanges of the sheave organization to receive a belt member therewithin. As such, the general purpose of the present invention, which will be described subsequently in greater detail, is to provide a new and improved tri-lobe sheave which has all the advantages of the prior art sheave apparatus and none of the disadvantages.

To attain this, the present invention provides a low speed adjusting sheave effecting varying ratios according to RPM and tension of an associated belt. The sheave structures include end caps resiliently biasing frusto-conical flanges into communication with one another to position a drive belt therebetween.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tri-lobe sheave which has all the advantages of the prior art sheave apparatus and none of the disadvantages.

It is another object of the present invention to provide a new and improved tri-lobe sheave which may be easily and efficiently manufactured and marketed.

It is a further object of the present invention to provide a new and improved tri-lobe sheave which is of a durable and reliable construction.

An even further object of the present invention is to provide a new and improved tri-lobe sheave which is susceptible of a low cost of manufacture with regard to both materials and labor, and which accordingly is then susceptible of low prices of sale to the consuming public, thereby making such tri-lobe sheaves economically available to the buying public.

Still yet another object of the present invention is to provide a new and improved tri-lobe sheave which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
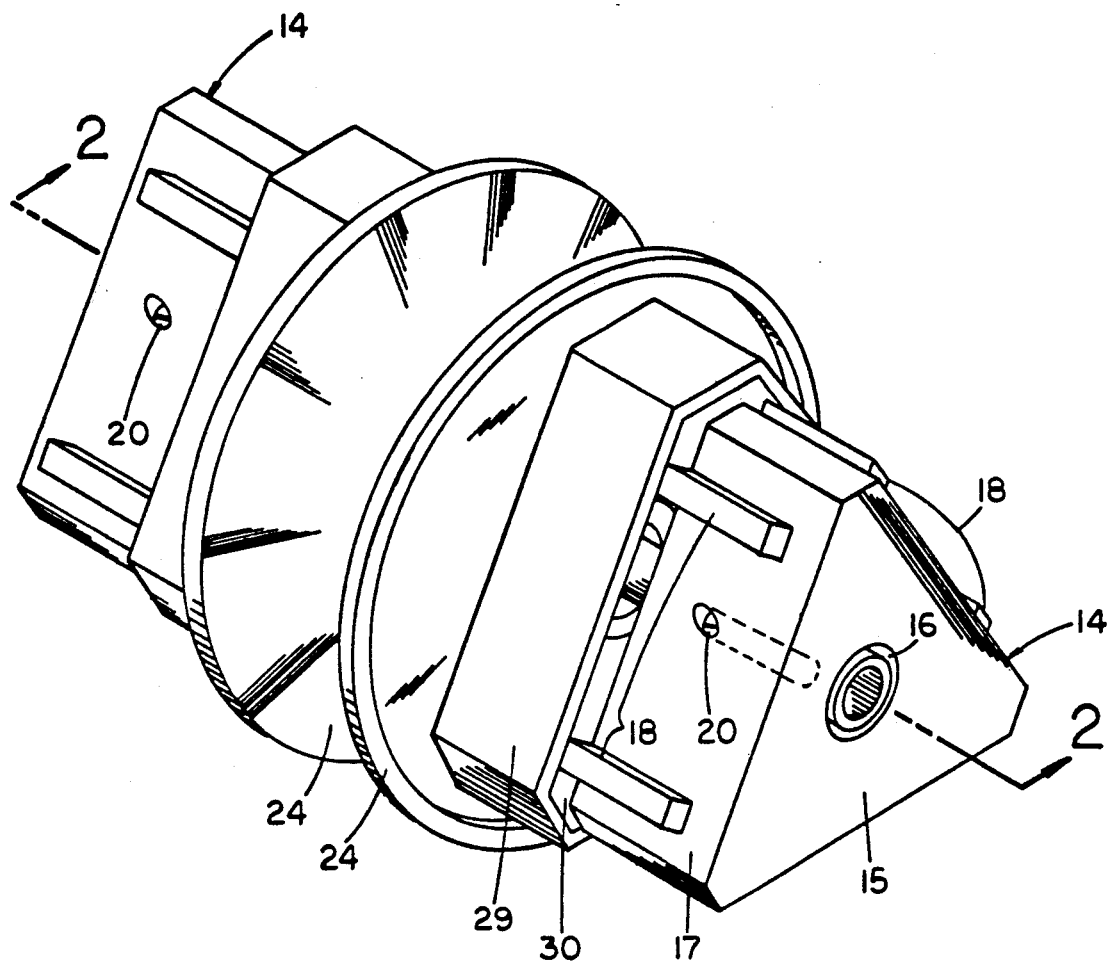
FIG. 1 is an isometric illustration of the instant invention.

With reference now to the drawings, and in particular to FIGS. 1 to 4 thereof, a new and improved tri-lobe sheave embodying the principles and concepts of the present invention and generally designated by the reference numeral 10 will be described.

Figure 2:
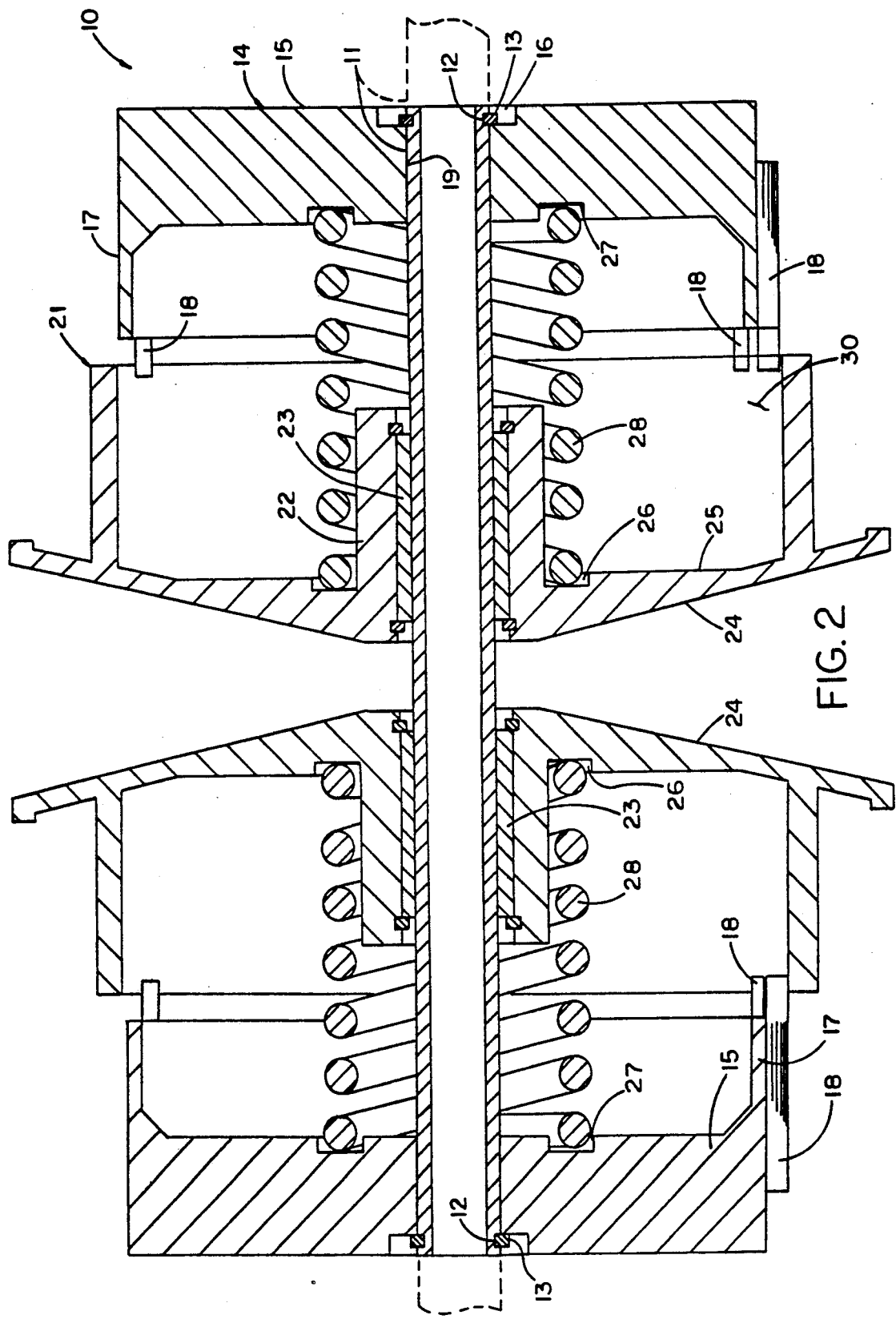
FIG. 2 is an orthographic view, taken along the lines 2—2 of FIG. 1 in the direction indicated by the arrows.
Figure 3:
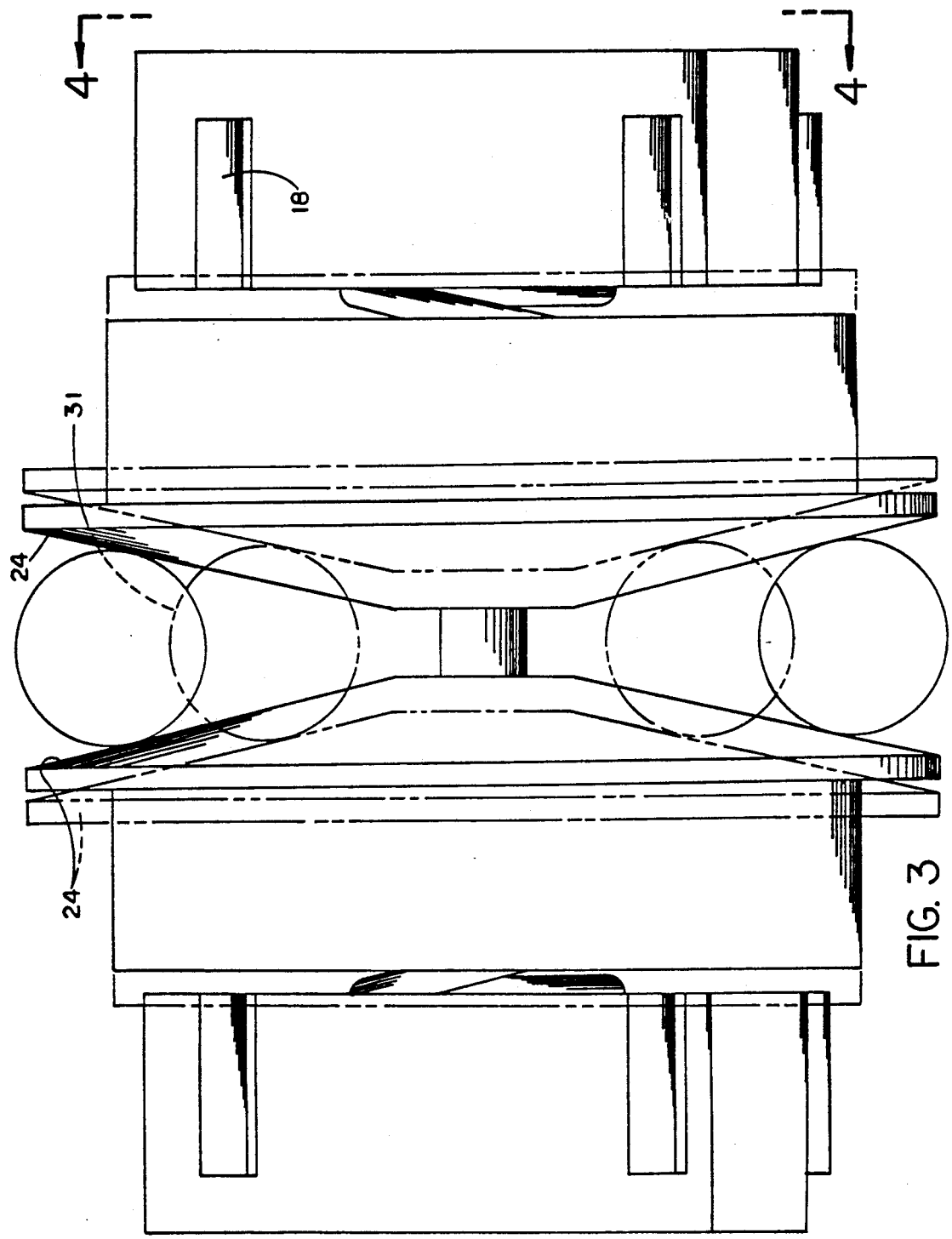
FIG. 3 is an orthographic side view of the invention illustrating the belt member contained therebetween in a plurality of orientations within the sheave structure dependent upon speed and tensioning of the belt member.
Figure 4:
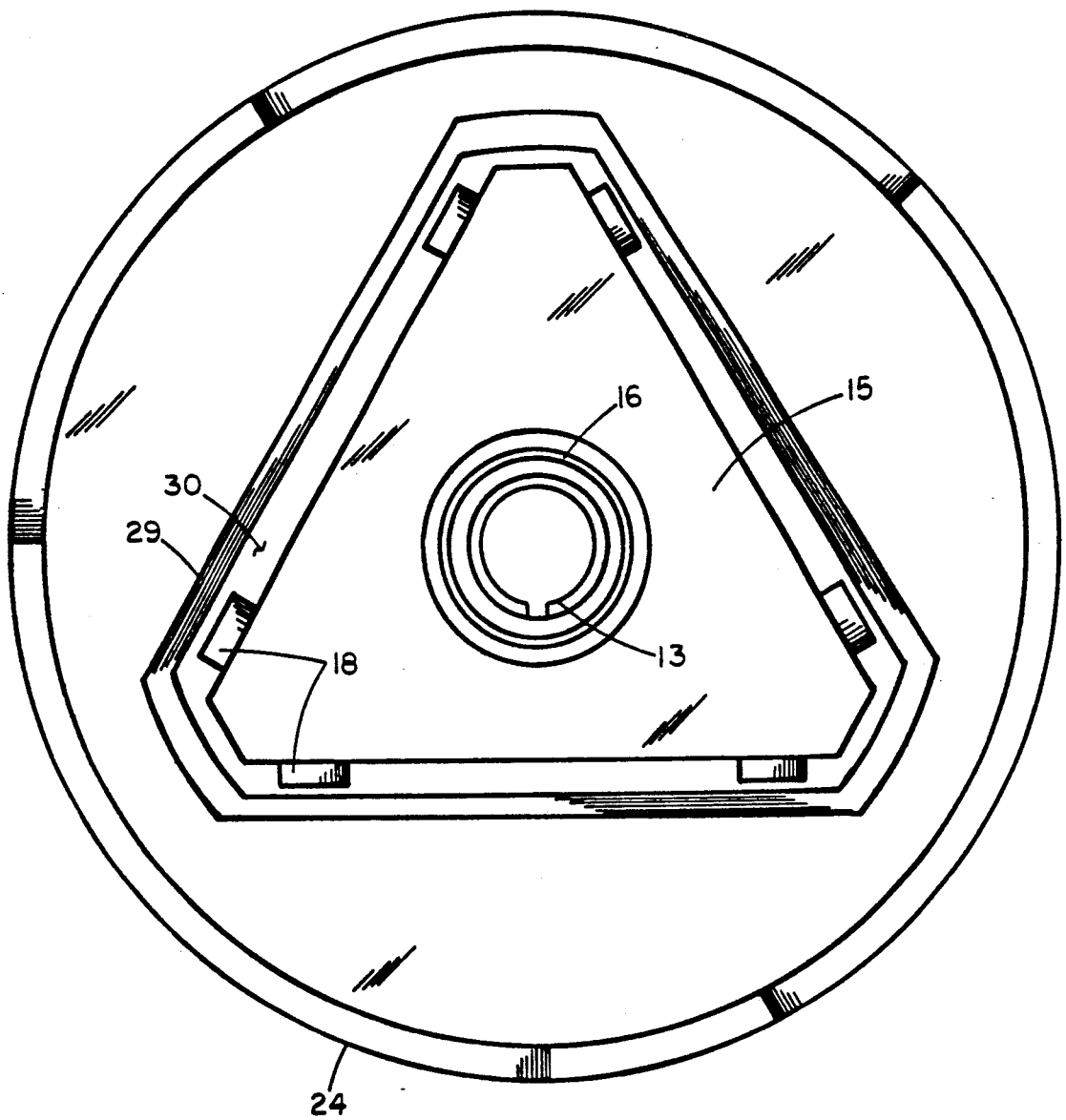
FIG. 4 is an orthographic view, taken along the lines 4—4 of FIG. 3 in the direction indicated by the arrows.

More specifically, the tri-lobe sheave 10 of the instant invention essentially comprises the organization mounted to a support shaft 11 that is directed coaxially through the tri-lobe sheave structure 10, in a manner as illustrated in FIG. 2 for example. The support shaft 11 is formed with spaced annular grooves 12, with each groove 12 receiving a resilient snap-ring member 13 of a generally semi-annular configuration received within the groove to position each end cap 14 of the sheave structure 10 between the spaced annular grooves 12. The end caps 14 each include an end wall 15, with the end wall 15 including a counter bore 16 and a through-extending central bore 19 receiving the support shaft 11. The end wall 15 is formed with a polygonal skirt 17 of at least three walls of a generally planar configuration, with each of the walls including a plurality of polymeric resilient bumper members 18 projecting beyond each skirt 17 in a parallel relationship relative to the central bore 19 to an orientation adjacent a hub member 21 in a first position, wherein the bumper members are arranged for minimizing impact and effecting longevity of use of the organization when the bumper members 18 are received within an associated polygonal cavity 30 of each of the hub members 21 upon axial sliding of each of the hub members 21 along the support shaft 11 during use of the organization. Lock fasteners 20 are directed through each of the end caps 14, and more specifically through at least one of the walls of the end caps, for fixed securement of each end cap 14 to the support shaft 11. The fastener structure 20 may be of any desired configuration to effect radial impact and communication with the support shaft 11 to fixedly secure the end cap 14 relative to the support shaft.

Each hub member 21 includes a central tubular support 22 coaxially aligned relative to each of the hub members 21, with the central tubular support 22 including a support bushing 23 therethrough slidably receiving the support shaft 11. A frustoconical flange 24 is formed to each of the hub members 21, wherein the frusto-conical flanges 24 are in confronting relationship relative to one another to receive a drive belt 31 therebetween. The drive belt is arranged to be slidably repositioned between the cooperating frusto-conical flanges 24 dependent upon belt tensioning and speed of the organization in use. The frusto-conical flanges 24 each include an interior wall surface 25 formed with an interior wall annular groove 26 positioned in a spaced relationship relative to an end wall annular groove 27 formed within an interior surface of each end cap end wall 15. A spring member 28 is thereby captured between the interior wall annular groove 26 and the end wall annular groove 27. The hub member includes a polygonal skirt 29 fixedly mounted relative to each frusto-conical flange 24 directed towards each annular groove 12, wherein the hub member polygonal skirt 29 defines the polygonal cavity 30 to complimentarily receive the end cap polygonal skirt 17 therewithin. In this manner, the end cap and the hub member are maintained in aligned relationship to avoid slippage of the hub members relative to the end caps.

It should be noted that the forwardly directed resilient bumper members 18 project into the polygonal cavity 30, as illustrated in FIG. 2, to maintain the orientation of each hub member 21 relative to each end cap 14.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A sheave apparatus, comprising,
   a support shaft, the support shaft including spaced annular grooves, and
   a plurality of end caps mounted between the annular grooves, with one of said end caps positioned adjacent one of said annular grooves, and
   each end cap including an end wall, and each end wall including a counter bore directed therewithin, and each counter bore receiving a resilient snap-ring member positioned within each counter bore in surrounding relationship relative to one of said annular grooves, and
   each end cap including a polygonal skirt, the polygonal skirt orthogonally oriented relative to the end wall, and
   the end wall including a central bore coaxially directed through the end wall receiving the shaft therethrough, and
   each polygonal skirt including at least three planar walls, and at least one of said planar walls including a lock fastener directed therethrough into communication with a support shaft to fixedly secure each end cap to the support shaft, and
   each end cap including a hub member, with hub members arranged in confronting relationship relative to one another between the end caps, and
   the hub members slidingly mounted to the support shaft to receive a drive belt therebetween.

2. An apparatus as set forth in claim 1 wherein each hub member includes a central tubular support, and each central tubular support including a support bushing to slidably receive the support shaft therethrough, and each central tubular support including a frusto-conical flange, wherein each frusto-conical flange of each hub member is arranged in confronting relationship relative to one another, and the frusto-conical flange of each hub member including a flange interior wall surface, and each flange interior wall surface including an interior wall annular groove, and each end cap end wall including an end cap end wall annular groove, wherein each end cap end wall annular groove is in confronting relationship to one of said interior wall annular grooves and receives a spring member captured therebetween.

3. An apparatus as set forth in claim 2 wherein each hub member includes a hub member polygonal skirt, the hub member polygonal skirt defines a polygonal cavity therewithin, the polygonal cavity is arranged to complimentarily receive the end cap polygonal skirt therewithin.

4. An apparatus as set forth in claim 3 wherein each end cap planar wall includes a plurality of polymeric resilient bumper member, with each bumper member projecting beyond each planar wall into the hub member polygonal cavity to position each hub member relative to each end cap and to further effect cushioning of each hub member relative to an adjacent end cap upon projection of an end cap into the hub member polygonal cavity.

* * * * *